(12) United States Patent  
Bae et al.

(10) Patent No.: US 10,109,259 B2  
(45) Date of Patent: Oct. 23, 2018

(54) METHOD FOR DISPLAYING MONITORING VIEWER IN HMI SYSTEM

(71) Applicant: LSIS CO., LTD., Gyeonggi-do (KR)

(72) Inventors: Ae-Kyoung Bae, Gyeonggi-do (KR); Shin-Jo Kong, Gyeonggi-do (KR); Yeo-Chang Yoon, Gyeonggi-do (KR); Seok-Chan Lee, Gyeonggi-do (KR); Seung-Ju Lee, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 42 days.

(21) Appl. No.: 15/355,864

(22) Filed: Nov. 18, 2016

(65) Prior Publication Data

US 2017/0278487 A1    Sep. 28, 2017

(30) Foreign Application Priority Data

Mar. 25, 2016   (KR) .................. 10-2016-0036211

(51) Int. Cl.
*G09G 5/393* (2006.01)
*G09G 5/14* (2006.01)
(Continued)

(52) U.S. Cl.
CPC ......... *G09G 5/393* (2013.01); *G05B 19/0423* (2013.01); *G05B 19/054* (2013.01); *G05B 23/0267* (2013.01); *G05B 23/0272* (2013.01); *G09G 5/14* (2013.01); *G06F 3/0483* (2013.01); *G09G 2354/00* (2013.01)

(58) Field of Classification Search
CPC ................ G09G 5/14; G09G 2340/10; G09G 2340/125; G06T 11/60; H04N 5/44504
See application file for complete search history.

(56) References Cited

U.S. PATENT DOCUMENTS 5,745,386 A * 4/1998 Wile ................ G01R 31/31704
                                                      703/15
7,295,178 B2 * 11/2007 Nakano ................ G09G 3/3666
                                                      345/205

(Continued)

FOREIGN PATENT DOCUMENTS

JP   H2-110627       4/1990
JP   H10-20928 A     1/1998

(Continued)

OTHER PUBLICATIONS

Office Action dated Aug. 1, 2017 issued in corresponding Japanese Application No. 2016-226576.

(Continued)

*Primary Examiner* — Todd Buttram
(74) *Attorney, Agent, or Firm* — K&L Gates LLP

(57) ABSTRACT

Disclosed herein is a method for displaying a monitoring viewer in an HMI system. The method includes, upon receiving a request to display a monitoring viewer from a user, acquiring screen data to be displayed in the monitoring viewer; displaying a control area of the monitoring viewer on a display; displaying a view area of the monitoring viewer on the display; and displaying a monitoring screen in the view area by using the screen data. The view area includes one or more taps. Monitoring performance and efficiency of the HMI system can be increased.

6 Claims, 4 Drawing Sheets

(51) Int. Cl.
*G05B 19/042* (2006.01)
*G05B 19/05* (2006.01)
*G05B 23/02* (2006.01)
*G06F 3/0483* (2013.01)

(56) References Cited

U.S. PATENT DOCUMENTS

| | | | | |
|---|---|---|---|---|
| 2009/0096815 | A1* | 4/2009 | Fukuda | G09G 5/02 |
| | | | | 345/690 |
| 2009/0287559 | A1* | 11/2009 | Chen | G06F 17/30867 |
| | | | | 705/14.23 |
| 2010/0223573 | A1* | 9/2010 | Tanaka | A61B 6/00 |
| | | | | 715/777 |
| 2012/0023092 | A1* | 1/2012 | Egan | G06F 17/30463 |
| | | | | 707/718 |
| 2013/0166819 | A1* | 6/2013 | Yerushalmi | G06F 3/0625 |
| | | | | 711/103 |
| 2014/0029498 | A1* | 1/2014 | Kim | H04W 52/0277 |
| | | | | 370/311 |
| 2014/0031090 | A1* | 1/2014 | Hart | H04W 52/0277 |
| | | | | 455/572 |
| 2016/0086557 | A1* | 3/2016 | Watanabe | G09G 3/3648 |
| | | | | 345/691 |

FOREIGN PATENT DOCUMENTS

| | | |
|---|---|---|
| JP | H10293609 A | 11/1998 |
| JP | H11-238027 | 8/1999 |
| JP | H11-238027 A | 8/1999 |
| JP | 2004-133581 A | 4/2004 |
| JP | 2005-100027 A | 4/2005 |
| JP | 2007213499 A | 8/2007 |
| JP | 2008-181521 A | 8/2008 |
| JP | 2008-533593 A | 8/2008 |
| JP | 2010-22653 A | 2/2010 |
| JP | 2010-165026 A | 7/2010 |
| JP | 2013-120461 A | 6/2013 |
| JP | 2014-206939 A | 10/2014 |
| KR | 10-2006-0000732 A | 1/2006 |
| KR | 101323536 B1 | 10/2013 |
| WO | 2011091271 A1 | 7/2011 |
| WO | 2012/086049 A1 | 6/2012 |

OTHER PUBLICATIONS

GP-Viewer EX Operation Manual; Digital Electronics Corporation; Jun. 2008.
Extended European Search Report dated May 2, 2017 corresponding to application 16199051.0-1802.
Korean Office Action dated Jun. 21, 2017 corresponding to application No. 10-2016-0036211.

* cited by examiner

PRIOR ART

METHOD FOR DISPLAYING MONITORING VIEWER IN HMI SYSTEM

CROSS REFERENCE TO RELATED APPLICATION

This application claims the benefit of Korean Patent Application No. 10-2016-0036211, filed on Mar. 25, 2016, entitled "METHOD FOR DISPLAYING MONITORING VIEWER IN HMI SYSTEM", which is hereby incorporated by reference in its entirety into this application.

BACKGROUND

1. Technical Field

The present disclosure relates to a method for displaying a monitoring viewer in a HMI system.

2. Description of the Related Art

A HMI (Human Machine Interface) system is used to provide users with graphical information in communications with a PLC (Programmable Logical Controller) used in factory automation. The HMI system is also connected to a camera or other media devices to provide operators with improved management service and displays graphical results of monitoring. The HMI system allows operators to monitor operation fields from a distant location and to observe accidents remotely. When an accident occurs, the scene at the current time and information before/after the accident can be stored and monitored in real-time.

Such a HMI system employs a program for providing a user with a variety of information pieces for monitoring, e.g., a monitoring viewer. The user may check a variety of types of data for monitoring and the status of the overall system via the monitoring viewer provided on a display device and may make a command to the HMI system as desired.

FIG. 1 is a view showing a monitoring viewer of a HMI system in the related art.

In the HMI system in the related art, a monitoring viewer shown in FIG. 1 is displayed on a display device to provide a user with data for monitoring. The monitoring viewer consists of a control area including a menu bar 102, a tool bar 104, a command bar 106 and a status bar 110, and a view area including a viewer 108.

In the related art, the monitoring viewer shown in FIG. 1 is displayed on the display device when a user sends a request to run the monitoring viewer. In particular, a screen for displaying a variety of data items for monitoring is rendered in the viewer 108. To this end, the HMI system acquires screen data from a memory disposed inside or outside the HMI system and displays a monitoring screen in the viewer 108 based on the to acquired screen data.

As can be seen from FIG. 1, the existing monitoring viewer includes only one viewer 108. Accordingly, when a user wants to obtain several monitoring information pieces, the user has to run a plurality of monitoring viewers like one shown in FIG. 1. When a plurality of monitoring viewers is run, a user has to manage several viewers simultaneously, which is inconvenient. In addition, system resources of the HMI system are used too much, such that the overall performance and efficiency of the system can be lowered.

SUMMARY

It is an aspect of the present disclosure to provide a method for displaying a monitoring viewer by which a user can operate, monitor and control a HMI system more conveniently and efficiently.

It is another aspect of the present disclosure to provide a method for displaying a monitoring viewer by which monitoring performance and efficiency of the a HMI system.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, a method for displaying a monitoring viewer includes, upon receiving a request to display a monitoring viewer from a user, acquiring screen data to be displayed in the monitoring viewer; displaying a control area of the monitoring viewer on a display; displaying a view area of the monitoring viewer on the display; and displaying a monitoring screen in the view area by using the screen data. The view area includes one or more tabs.

According to an exemplary embodiment of the present disclosure, a user can operate, monitor and control a HMI system more conveniently and efficiently.

In addition, according to an exemplary embodiment of the present disclosure, to monitoring performance and efficiency of the HMI system can be increased.

DETAILED DESCRIPTION

Figure 1:
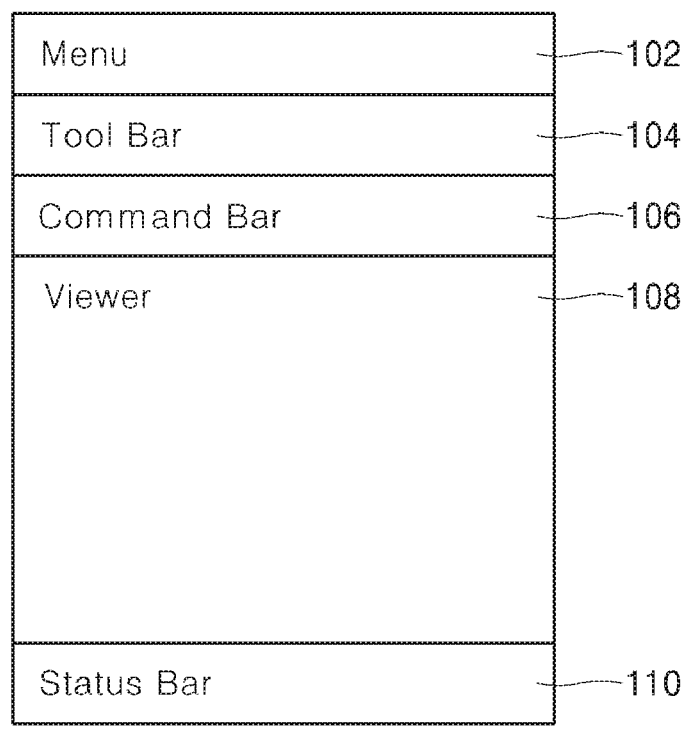
FIG. 1 is a view showing a monitoring viewer of a HMI system in the related art.

The above objects, features and advantages will become apparent from the detailed description with reference to the accompanying drawings. Embodiments are described in sufficient detail to enable those skilled in the art in the art to easily practice the technical idea of the present disclosure. Detailed disclosures of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Figure 2:
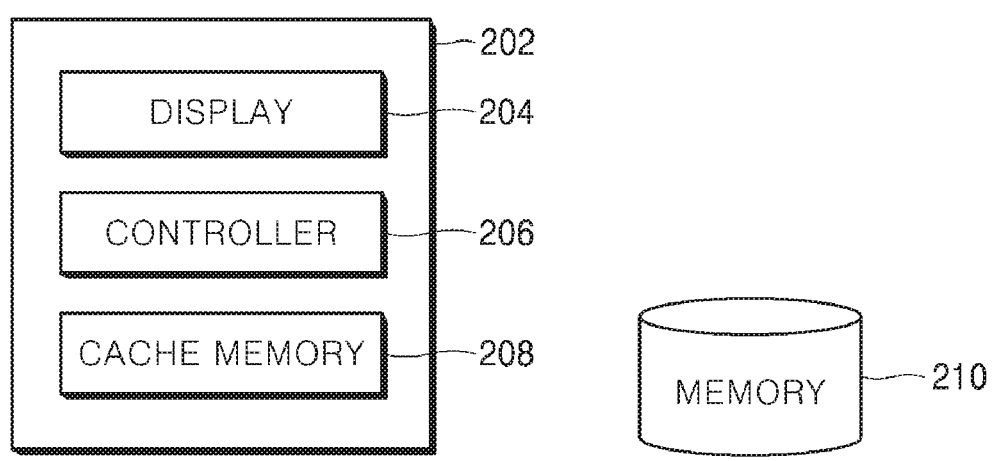
FIG. 2 is a block diagram of a HMI system according to an exemplary embodiment of the present disclosure.

FIG. 2 is a block diagram of a HMI system according to an exemplary embodiment of the present disclosure.

Referring to FIG. 2, a HMI system 202 according to an exemplary embodiment of the present disclosure include a display 204 and a controller 206.

The display 204 displays information for a user to operate, monitor and control the HMI system. According to an exemplary embodiment of the present disclosure, the display 204 may display a monitoring viewer shown in FIG. 4.

The controller 206 receives a request to display a monitoring viewer from a user and displays a monitoring viewer on the display 204 in response to the user's request.

According to an exemplary embodiment of the present disclosure, upon receiving a request to display a monitoring viewer from a user, the controller 206 acquires screen data to be displayed in the monitoring viewer. In addition, the controller 206 displays a control area and a view area of the monitoring viewer on the display. The controller 206 displays a monitoring screen in the view area by using the acquired screen data.

According to an exemplary embodiment of the present disclosure, the controller 206 may load priority screen data from a memory to store it in a cache memory 208 before a user sends a request to display a monitoring viewer. As used herein, "priority screen data" refers to data that has to be processed in advance over other screen data. For example, a user may designate a monitoring screen that is frequently visited or is important as the priority screen data in advance.

In addition, the controller 206 may count processing time of each screen data and may set screen data whose counted processing time exceeds a predetermined reference processing time as the priority screen data. As used herein, "processing time" refers to time taken for loading data or rendering.

In addition, the reference processing time may be set arbitrarily by the user or the controller 206. According to the exemplary embodiment of the present disclosure, such priority screen data is stored in the cache memory 208 before a user sends a request to display a monitoring viewer, so that the monitoring viewer can be displayed more quickly.

According to an exemplary embodiment of the present disclosure, the controller 206 may search the cache memory 208 for screen data to display the view area of the monitoring viewer. As the priority screen data may be stored in the cache memory 208 as described above, the controller 206 may search the cache memory 208 first to acquire the priority screen data. After searching the cache memory 208, the controller 206 may configure screen data by using data acquired from the memory 210. For example, the controller 206 may serialize the data acquired from the memory 210 to create screen data, and may display the view area by using the created screen data.

According to an exemplary embodiment of the present disclosure, the view area may include one or more tabs. The one or more tabs include an active tab and inactive tabs. The active tab is the tab that is selected by the user and is currently activated on the display. The inactive tabs are the other tabs than the active tab.

According to an exemplary embodiment of the present disclosure, the update cycle of the active tab may be set to be shorter than that of the inactive tabs. According to an exemplary embodiment of the present disclosure, when a user activates one of the inactive tabs, it may be updated immediately irrespectively of the update cycle. According to an exemplary embodiment of the present disclosure, the update cycle of an inactive tab may be set to be shorter as the screen displayed in the inactive tab is larger. According to an exemplary embodiment of the present disclosure, the inactive tabs may not be updated until they are activated and may be updated as soon as they are activated.

Referring back to FIG. 2, the HMI system 202 according to an exemplary embodiment of the present disclosure may further include a cache memory 208. The cache memory 208 reads and writes data faster than the memory 210. The priority screen data may be stored in the cache memory 208. When displaying the monitoring viewer, the controller 206 searches the cache memory 208 first to acquire screen data, such that the monitoring viewer can be displayed faster.

The memory 210 is a storage medium that stores a variety of types of data to be displayed in the monitoring viewer. In the memory 210, image or text data for configuring screen data and other data for monitoring the HMI system may be stored.

Although the HMI system 202 shown in FIG. 2 includes the cache memory 208 therein, the cache memory 208 may be disposed outside the HMI system 202 according to another exemplary embodiment. In addition, although the memory 210 is disposed outside the HMI system 202 in FIG. 2, the memory 210 may be disposed in the HMI system 202 according to another exemplary embodiment.

Figure 3:
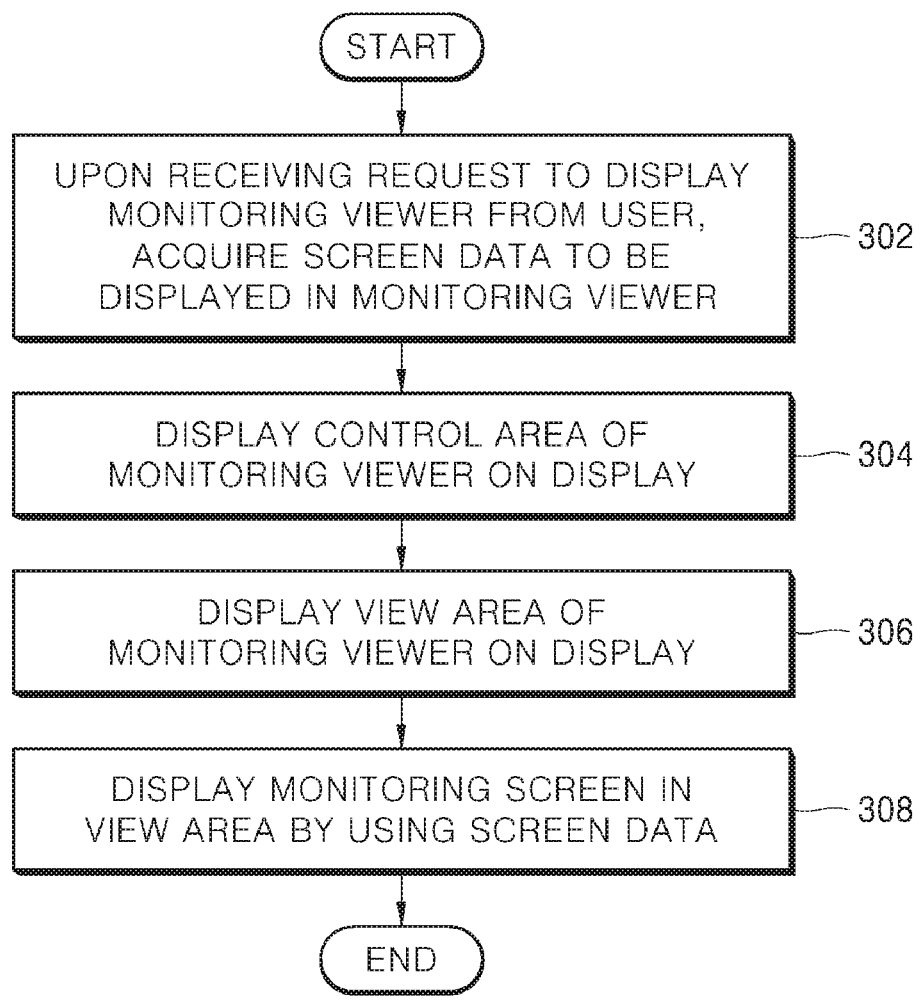
FIG. 3 is a flow chart for illustrating a method for displaying a monitoring viewer of the HMI system according to an exemplary embodiment of the present disclosure.
Figure 4:
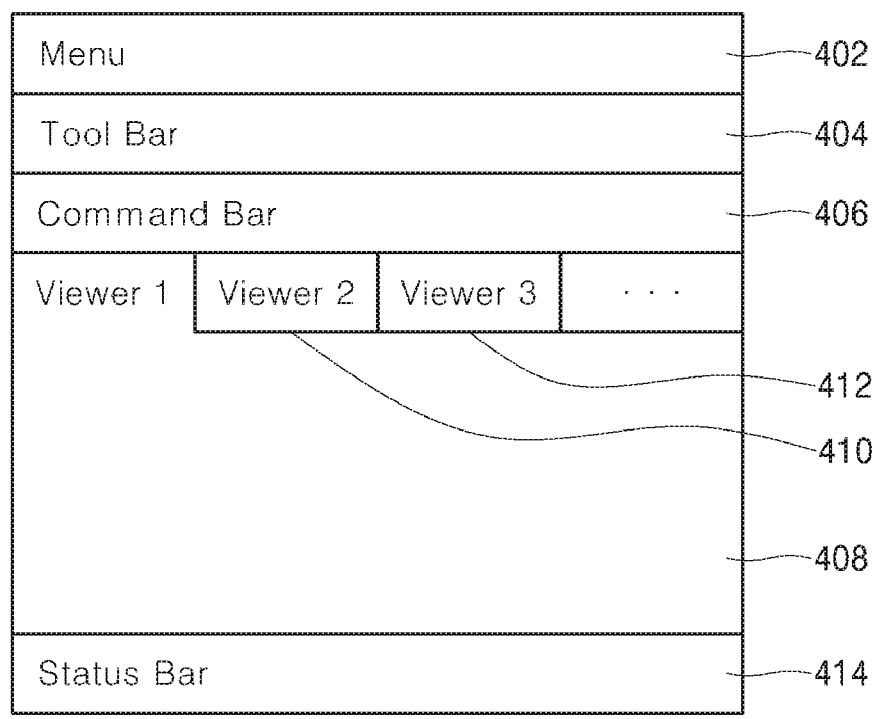
FIG. 4 is a diagram showing a configuration of a monitoring viewer according to an exemplary embodiment of the present disclosure.

FIG. 3 is a flow chart for illustrating a method for displaying a monitoring viewer of the HMI system according to an exemplary embodiment of the present disclosure. FIG. 4 is a diagram showing a configuration of a monitoring viewer according to an exemplary embodiment of the present disclosure.

Hereinafter, a method for displaying a monitoring viewer of a HMI system to according to an exemplary embodiment of the present disclosure will be described in detail with reference to FIGS. 2 and 4.

Upon receiving a request to display a monitoring viewer from a user, the controller 206 acquires screen data to be displayed in the monitoring viewer (step S302). To acquire screen data, the controller 206 may search the cache memory 208 first. As described above, priority screen data including at least one of screen data designated by the user in advance and screen data whose loading time exceeds a predetermined reference processing time may be stored in cache memory 208. If such priority screen data is stored in the cache memory 208, the controller 206 loads the priority screen data first to render a monitoring screen in the view area on the display.

After searching the cache memory 208, the controller 206 may acquire data for configuring screen data from the memory 210 and configure (serialize) screen data to be displayed in the view area by using the acquired data. The controller 206 may load screen data thus configured to render the monitoring screen in the view area on the display.

When searching the cache memory 208 or the memory 210, the controller 206 may search for screen data based on a key value (e.g., a file name) of the screen data to be displayed in the monitoring viewer requested by the user.

Although not shown in FIG. 3, the controller 206 may load priority screen data from the memory to store it in the cache memory before step S302, i.e., before the user sends a request to display a monitoring viewer. For example, if the user designates a screen that the user prefers or visits frequently, the controller 206 may search the memory 210 for screen data corresponding to the designated screen and may store the found screen data in the cache memory 208 as the priority screen data. In addition, the controller 206 may count processing time of each screen data stored in the memory 210 and may store screen data whose counted processing time exceeds a predetermined reference processing time in the cache memory 208 as the priority screen data.

Subsequently, the controller 206 displays a controller area of a monitoring viewer on the display (step S304). FIG. 4 is a diagram showing a configuration of a monitoring viewer according to an exemplary embodiment of the present disclosure. In FIG. 4, the control area includes a menu bar 402, a tool bar 404, a command bar 406 and a status bar 414.

Subsequently, the controller 206 displays a view area of the monitoring viewer on the display (step S306). In FIG. 4, the view area includes one or more tabs 408, 410, 412, . . . .

Although FIG. 3 illustrates the controller 206 displays the control area (step S304) first and then displays the view area (step S306), the controller 206 according to another exemplary embodiment of the present disclosure may display the view area first and then display the control area.

Subsequently, the controller 206 displays monitoring screens in the view areas 408, 410, 412, . . . by using screen data. The controller 206 may acquire screen data corresponding to each of the view areas 408, 410, 412, . . . and may render the acquired screen data in each of the view area 408, 410, 412, . . . to display the monitoring screens.

According to another exemplary embodiment of the present disclosure, a method for displaying a monitoring viewer may include acquiring screen data to be displayed in the monitoring viewer upon receiving a request to display a monitoring viewer from a user (step S302), and displaying a monitoring screen in the view area of the monitoring viewer by using the acquired screen data (step S308).

As shown in FIG. 4, the view area of the monitoring viewer displayed by the method according to the exemplary embodiment of the present disclosure includes one or more tabs. According to an exemplary embodiment of the present disclosure, a user runs only one monitoring viewer and creates a plurality of tabs in the viewer, such that a number of monitoring information pieces can be obtained simultaneously. Accordingly, the user can operate, monitor and control the HMI system more conveniently. In addition, the HMI system need not run a number of monitoring viewers, such that system resources are less used and thus the overall performance and efficiency of the system can be improved.

Referring back to FIG. 4, the tabs included in the view area of the monitoring viewer displayed by the method according to the exemplary embodiment of the present disclosure may be divided into an active tab and inactive tabs. The active tab is the tab that is selected by the user and is currently activated on the display. The inactive tabs are the other tabs than the active tab. In FIG. 4, the tab 408 is an active tab, and the tabs 410, 412, . . . are inactive tabs. The user may switch one of the inactive tabs 410, 412, . . . over to the active tab at any time while the user is using the monitoring viewer. At that time, the previous active tab 408 may be switched over to an inactive tab.

Although not shown in FIG. 3, according to an exemplary embodiment of the present disclosure, the controller 206 may set the update cycle of the active tab to be different from the update cycles of the inactive tabs. In each of the tabs 408, 410, 412, . . . of the view area shown in FIG. 4, a variety of data items for monitoring the HMI system are displayed, such as power consumption, temperature value, etc. Such data items are used by programs corresponding to the respective tabs 408, 410, 412, . . . and may be updated at certain cycles. Accordingly, each of the tabs 408, 410, 412, . . . has its own update cycle corresponding to the respective programs.

In the view area with the taps 408, 410, 412, . . . shown in FIG. 4, if all of the tabs 408, 410, 412, . . . are updated at their own cycles, the system resources are used too much. According to an exemplary embodiment of the present disclosure, the update cycle of the active tab 408 is set to be different from the update cycles of the inactive tabs 410, 412, . . . .

According to an exemplary embodiment of the present disclosure, the update cycle of the active tab 408 may be set to be shorter than the update cycles of the inactive tabs 410, 412, . . . . For example, if the original update cycle of the inactive tab 410 is five seconds, the actual update cycle of the inactive tabs may be set to 5xy, where y is a natural number. As a result, the active tab 408 is updated at the original update cycle required by the program, whereas the inactive tabs 410, 412, . . . are updated more slowly than the original update cycles. In this manner, the system resource used for updating the inactive tabs 410, 412, . . . can be reduced.

According to an exemplary embodiment of the present disclosure, the update cycles of the active tab 408 and the update cycles of the inactive tabs 410, 412, . . . may be arbitrarily set by the user, respectively.

According to an exemplary embodiment of the present disclosure, when a user activates one of the inactive tabs 410, 412, . . . , the controller 206 may be update the tab immediately. For example, if the user selects the inactive tab 410 to activate it while the monitoring viewer is display as shown in FIG. 4, the controller 206 updates the inactive tab 410 immediately and switch it over to the active tab, irrespectively of the update cycle 5xy set by the controller 206. Accordingly, the active tab 408 is switched over to the inactive tab.

According to an exemplary embodiment of the present disclosure, the controller 206 may set the update cycle of an inactive tab with a larger screen to be shorter. The larger the size of the screen displayed in an inactive tab is, the longer time it takes to update the screen. By doing so, the update delay taken when the user switches the inactive tab over to the active tab can be reduced.

According to an exemplary embodiment of the present disclosure, the controller 206 may not update the inactive tabs 410, 412, . . . until they are activated. For example, when the monitoring viewer is displayed as shown in FIG. 4, the controller 206 may update only the active tab 408 at the original update cycle and may not update the inactive tabs 410, 412, . . . . When the user wants to select the inactive tab among the inactive tabs 410, 412, . . . to active it, the controller 206 may update the selected tab 410 immediately and switch it over to the active tab. By doing so, the resource used for updating the inactive tabs 410, 412, . . . can be further reduced, thereby improving the system performance.

According to another exemplary embodiment of the present disclosure, if no external input is received for a predetermined input time period, the controller 206 may increase the initially set update cycles of all of the tabs 408, 410, 412, . . . or may not update all of the tabs at all until an external input is received. The external input may be a select signal received from the user.

In this manner, the resource used for updating all of the tabs 408, 410, 412, . . . while the user is not using the HMI system may be reduced, thereby improving the system performance.

The present disclosure described above may be variously substituted, altered, and modified by those skilled in the art to which the present invention pertains without departing from the scope and sprit of the present disclosure. Therefore, the present disclosure is not limited to the above-mentioned exemplary embodiments and the accompanying drawings.

What is claimed is:

1. A method for displaying a monitoring viewer in a HMI system, the method comprising:
   upon receiving a request to display the monitoring viewer from a user, acquiring screen data to be displayed in the monitoring viewer; and
   displaying a monitoring screen in a view area of the monitoring viewer by using the screen data, wherein the view area comprises one or more tabs,
   the one or more tabs comprise an active tab which is selected to be activated by the user and inactive tabs which comprise the remainder of the one or more tabs, excluding the active tab, the inactive tabs are periodically updated when they are not activated, an update cycle of the active tab is set to be shorter than an update cycle of the inactive tabs, and the update cycle of each of the inactive tabs is set so that the larger the size of a screen displayed therein, the shorter the update cycle.

2. The method of claim 1, further comprising:

loading priority screen data from a memory to store the priority screen data in a cache memory before the request is input.

3. The method of claim 2, wherein the priority screen data comprises screen data designated by the user in advance and/or screen data whose processing time exceeds a predetermined reference processing time.

4. The method of claim 1, wherein the acquiring screen data to be displayed in the monitoring viewer comprises:

searching the cache memory to acquire the screen data; and configuring the screen data by using data acquired from the memory.

5. The method of claim 1, wherein when the user activates one of the inactive tabs, the activated inactive tab is updated immediately.

6. The method of claim 1, further comprising:

displaying a control area of the monitoring viewer on a display; and displaying the view area of the monitoring viewer on the display.

* * * * *